United States Patent [19]
Atai

[11] Patent Number: 5,778,057
[45] Date of Patent: Jul. 7, 1998

[54] SERVICE CONTROL POINT CONGESTION CONTROL METHOD

[75] Inventor: Amir Atai, Middletown, N.J.

[73] Assignee: Bell Communications Research, Inc., Morristown, N.J.

[21] Appl. No.: 599,573

[22] Filed: Feb. 9, 1996

[51] Int. Cl.[6] .................................................. H04M 15/08
[52] U.S. Cl. ......................... 379/220; 379/111; 379/134; 379/196
[58] Field of Search .................... 379/220, 221, 379/207, 111, 112, 134, 137, 139, 201, 196

[56] References Cited

U.S. PATENT DOCUMENTS

| | | | |
|---|---|---|---|
| 4,224,479 | 9/1980 | Crawford | 379/201 |
| 5,524,145 | 6/1996 | Parker | 379/207 |
| 5,570,410 | 10/1996 | Hooshiari | 379/111 |
| 5,581,610 | 12/1996 | Hooshiari | 379/112 |

OTHER PUBLICATIONS

IEEE/ACM Transactions on Networking, vol. 3, No. 5, Oct. 1995, by "Donald E. Smith", Ensuring Robust Call Throughput and Fairness for SCP Overload Controls, pp. 538–548.

Primary Examiner—Ahmad F. Matar
Attorney, Agent, or Firm—Joseph Giordano; David Hey; Loria B. Yeadon

[57] ABSTRACT

A method of managing the overloading of calls directed to a single telephone number. The method enables Service Control Point to service calls a small percentage of the time during measurement intervals in order to receive Termination Notification messages. The Service Control Point then determines, from the contents of the Termination Notification messages for each measurement interval, the rate of attempted calls and the fraction of the total calls that were incomplete, (i.e., erroneous or received a busy signal) for a telephone number n, and invokes Automatic Code Gapping for the number n where both the attempted call rate and the incomplete calls exceed a predetermined threshold. If the threshold continues to be exceeded in subsequent measurement intervals, a larger gap interval for the Automatic Code Gapping can be set, and the process repeated until the proper gap is found.

10 Claims, 2 Drawing Sheets

SERVICE CONTROL POINT CONGESTION CONTROL METHOD

BACKGROUND OF THE INVENTION

1. Field of Invention

The present invention relates to congestion control of telephone traffic in a signalling network, and more particularly, to a method of managing congestion caused by a sudden increase in the volume of traffic to a single telephone number.

2. Discussion of Related Art

A sudden increase in the volume of traffic to a single telephone number of Service Control Point (SCP) service numbers, such as 800 numbers, is typically caused by media-stimulated mass calling events. These events are usually initiated by announcements on TV or radio asking viewers to call a single number to register a vote, to buy a ticket, or to win a prize, for example. Although, there are several congestion control methods in existence that can be invoked to remedy the situation, they cause other calls which are not directed to the single congested number to be either throttled or discarded in the network.

For example, there is a congestion control procedure in the Signaling System 7 (SS7) protocol called Transfer Controlled (TFC). This procedure is invoked when certain thresholds on the signalling link transmit buffer are exceeded. However, the TFC as a Message Transfer Part (MTP)3 layer procedure is mainly designed to protect the links during congestion. The overflow traffic messages are throttled or discarded based on their priority and the level of congestion in the signaling link transmit buffers. When TFC is invoked, signalling messages are controlled without any explicit relationship to a particular dialed number or specific service. In other words all messages belonging to all calls and services that share the congested link are subject to control.

Another well known congestion control method, which is termed Automatic Code Gapping (ACG), operates between Service Switching Points (SSP), of the network, and SCP. The ACG procedure is invoked based on certain measurements in the SCP. Depending on the level of overload in the SCP, a gap interval and duration is transmitted to the SSP. This reduces the number of calls to a plurality of numbers on a Numbering Plan Area (NPA) code or, where N is any digit from 2 to 9 and X is any digit from 0 to 9, on an (NPA-NXX) basis.

The ACG generally protects the SCP from congestion, but situations arise where the overloading of a single number can render the ACG ineffective. For example, a mass calling event was widely advertised in one local Access Transport Area (LATA) and all calls were routed to a single 800 number that had only a few operators answering the calls. Four links in the D-link Quad (one link in each link set) connected the Local Signal Transfer Points (LSTP) to the Regional Signal Transfer Points (RSTP). Thus, the D-link quad connecting the LATA, which was originating the calls, had a capacity of about 280 queries per second using 100 octets for the size of each query message. The capacity of the SCP was about 450 queries per second. Since the D-link quad had a smaller capacity than the SCP, the D-link quad became congested while the SCP still had sufficient capacity. This resulted in the Transfer Controlled procedure being invoked on the D-link quad, which in turn dropped several calls to all of the 800 numbers and any other messages that shared the D-link quad.

The known procedures for handling large amounts of traffic to a single number, such as choke networks, and the SCP capability of associating a number of lines with a particular number require advance notice to the phone company in order to be effective. Unfortunately, subscribers do not always provide such notice, nor do they advise the company of the number of operators that are to be assigned to a particular number.

In light of the foregoing, there is a need for a method of managing overload events directed to a single telephone number that does not require notifying the phone company in advance of the anticipated overloading or the number of operators that will be available to handle such calls, and also does not adversely affect calls to other numbers of the particular service.

SUMMARY OF THE INVENTION

Accordingly, the present invention is directed to a method of managing a sudden increase in traffic to a single telephone number that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and obtained by the apparatus and method particularly pointed out in the written description and claims hereof as well as the appended drawings.

To achieve these and other advantages, and in accordance with the purpose of the invention, as embodied and broadly described, the invention is a method of managing overload events directed to a single subscriber telephone number n which includes the steps of sampling SCP calls for a fraction of all queries during successive measurement intervals, processing Termination Notification (TN) messages received during each current successive measurement interval (T), determining an amount of overloading of a telephone number n following each measurement interval in accordance with a processed TN message, and invoking ACG on the number n at times when the determined amount of overloading is excessive.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate the embodiment of the invention, and together with a description serve to explain the principles of the invention.

DESCRIPTION OF PREFERRED EMBODIMENTS

Figure 1:
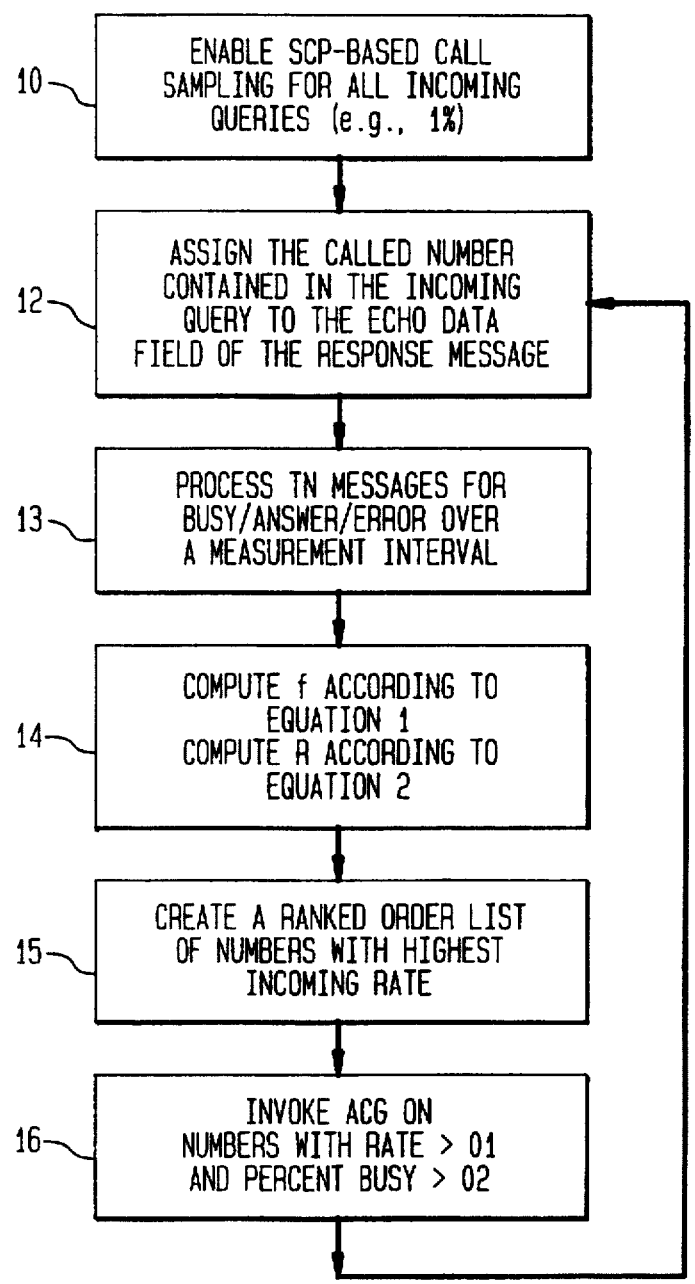
FIG. 1 is a flow chart illustrating the steps in one embodiment of the method of the present invention.

In describing the preferred embodiments, reference is made to the drawings wherein like reference numerals refer to like parts to the extent possible.

In accordance with the present invention, the method of managing overload events directed to a single subscriber telephone number n, comprises the step of sampling SCP calls for all queries received at SCP during successive measurement intervals.

As herein embodied and referring to FIG. 1, initially the well-known SCP-based call sampling procedure is enabled for sampling calls during selected measurement intervals as indicated at step 10. Such measurement interval can be any interval of time that will provide meaningful information concerning the activity of a particular number, such as ten seconds, for example.

SCP-based call sampling, which permits the local phone company to obtain information on how the calls for a particular subscriber are being completed, operates as follows. The SCP, after receiving a query message from a SSP, can respond to that message by requesting the SSP to send a Termination Notification message to the SCP reporting the status of the sampled call. The TN message includes information about each call mainly for billing and maintenance purposes. Specifically, the TN message includes information as to the duration of a completed call, and whether or not a particular call was answered, received a busy signal, or was lost. For the purposes of the present invention, instead of using the SCP call sampling on request per customer, the method of the present invention requires that SCP be enabled, for 1 of all the queries, for example, and remain enabled for the duration of the corresponding measurement interval.

In accordance with the present invention, the method includes processing the received TN messages during each current successive measurement interval. As herein embodied, and as indicated generally at 12 of FIG. 1, the method includes assigning the called number contained in the incoming query to the Echo Data field of the response message, then calculating the number of busy calls $B_n$, the number of answered calls $A_n$, the number of no-answer calls $G_n$, and the number of erroneous (lost) calls $E_n$ associated with a telephone number n occurring during the measurement interval T as indicated at step 13.

The foregoing parameters are obtained from the SSP as follows: The call processing record in the SCP requires that the response from the SCP may request the SSP to send termination information about a call. The termination information will contain a 6-octet echo data field. The SSP associates the number in this echo data field with the call so that it may be included in a termination message returned to the SCP when the call terminates. However, the Private Virtual Network (PVN) requirements do not specify what should be put in the echo data field. Well known SCPs currently use an Automatic Message Accounting (AMA) related index instead of the called number in the echo data field. The dialed number is then determined by a translation of the AMA index. The TN message also includes Network Management Control list overflow indication, answer indication, connect time, and error indication. For the error indication, PVN requires five different types of error conditions, namely, (1) caller abandoned before receipt of the response message, (2) SSP timer expiration, (3) SSP failure, (4) bad data in response message, and (5) protocol error in TCAP portion of the response message. Thus, the parameter $E_n$ in the present invention refers to the sum of the above listed errors.

In accordance with the present invention the method includes the step of determining the amount of overloading of a telephone number n following each measurement interval in accordance with a processed TN message. As herein embodied, and as indicated in step 14 of FIG. 1, at the end of the current measurement interval, the percentage of the total calls to the number n occurring during the measurement interval that received a busy signal or were not included because of errors, referred to herein as $f_{B_n}$, is calculated as follows:

$$f_{B_n} = \frac{B_n + E_n}{B_n + A_n + G_n + E_n} \quad \text{equation(1)}$$

The value $E_n$ is included in this definition because during congestion some of the calls may not be successfully completed. Therefore, a high value of $f_{B_n}$ would indicate a possible congestion and the fact that the operators are exhausted.

Also, at the end of the current measurement interval, the estimated rate of attempted calls to the number n during the measurement level, referred to herein as $R_n$ is calculated as follows:

$$R_n = \left( \frac{B_n + A_n + G_n + E_n}{T} \right) \left( \frac{1}{f_s} \right) \quad \text{equation(2)}$$

where $f_s$ is the percentage of all transactions to an SCP that are requested to send a TN message and where T denotes the length of SCP measurement interval in seconds during which Termination Notification messages are collected and processed. The term $f_s$ is greater than zero and less than or equal to one.

The invention includes creating a ranked order list of numbers with the highest incoming rate as indicated at step 15.

In accordance with the present invention, the method includes invoking automatic code gapping on the number n at times when the determined amount of overloading is excessive. As embodied herein, and as illustrated in step 16 of FIG. 1, the value $R_n$ is compared to a threshold value $O_1$ and value $f_{B_n}$ is compared to a threshold value $O_2$. Preferably, the method should first compare $R_n$ to the threshold $O_1$, and if $R_n$ is greater than $O_1$, then the value $f_{B_n}$ is compared to the threshold $O_2$. If $f_{B_n}$ exceeds this threshold, then automatic code gapping (ACG) is invoked.

Figure 2:
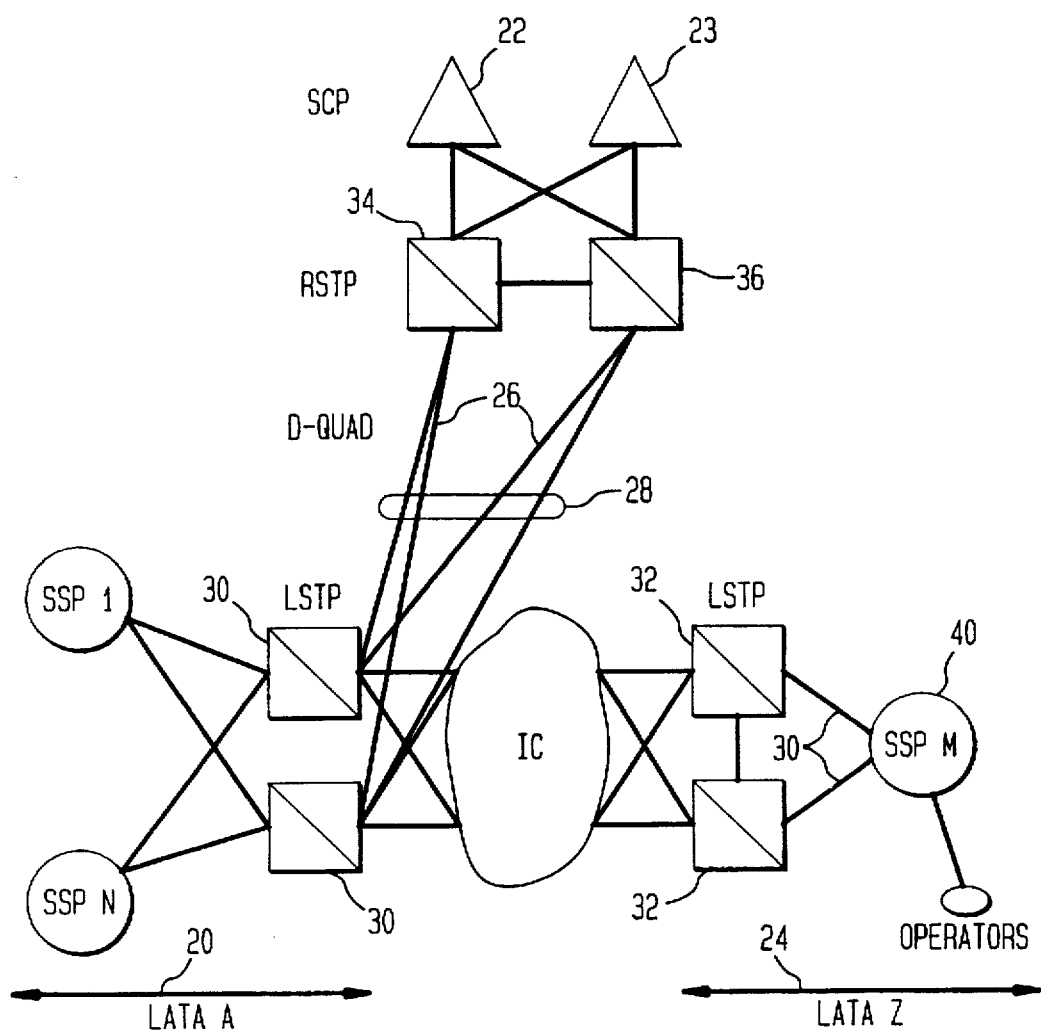
FIG. 2 illustrates a network configuration that incorporates the teachings of the present invention.

A more detailed description of the operation of a typical network will be given in connection with FIG. 2. An example of the operation of the network without the benefit of the present invention is first described, which description is followed by an example with the benefit of the present invention.

Assuming a single 800 number 1-800-555-1111 is advertised in LATA A defined by arrow 20. The 1-800-555-1111 calls are translated in SCPs 22 and 23, and then routed to a location in a different LATA Z defined by arrow 24. Suppose the capacity of single SCP 22 is 450 queries per second. Assume that there is only one link in D-link set 26, and a total of 4 links in a D-link quad 28 connecting LSTP pair 30 and 32 to RSTP pair 34 and 36, which is a common sizing. Using 100 octet for the size of a query message, the capacity of a single D-link is simply 70 queries per second. Thus, the D-quad 28 consisting of 4 links will have a capacity of 4×70 or 280 queries per second.

Suppose the Service Control Point (SCP) load prior to the media event was at 40 percent of its capacity, 0.4×450=180 or about 200 queries per second. Also suppose that the media event adds a sudden additional 100 queries per second to the load of a single SCP 22, which provides a total of 200 new queries to the mated SCP 23. Thus, the total new load on a single SCP is now 300 queries per second which consists of the 200 queries of background traffic and an additional 100 queries per second of new traffic focused on a single telephone number. However, the total load of 300 is still below the SCP capacity of 450. Thus SCP 22 or 23 is not overloaded, and the ACG procedure will not be invoked.

However, the 200 queries per sec of new traffic, which is carried over the D-quad 28 to both mated SCPs 22 and 23 plus the base load that existed on the D-links (0.4×70×4= 112), is sufficient to drive the D-link quad 28 of LATA A into overload; the base load is the existing traffic load on the D-links associated with normal traffic before the start of the additional traffic that will be generated due to a focused overload event. This will cause the TFC procedure to be invoked which will request switches not to send messages of certain priority depending on the congestion level in the transmit links of the D-quad. During this time, switches will throttle those messages destined to use the D-quad regardless of whether they belong to the 1-800-555-1111 or any other service. The above example, taken from a real event, clearly illustrates that it is possible for the SCP 22 or 23 not to be congested while another segment of the network is congested, such as the D-quad. The irony is that the call level control method that could have helped effectively, namely ACG, would not be invoked unless the event was a priori known by network managers before hand, such that a very low threshold was put on the specific number.

Note that adding another link to the link sets in D-quad 28 does not necessarily solve the problem, but shifts the overload to another segment of the network. If the D-link sets had two links, each resulting in a capacity of 560 queries per second, then, depending on the amount of new load, either SCP 22,23, or the quad 28 connecting LATA A to the IC, or more likely the Alless-links 30 connecting the target switch, shown as SSP 40 in FIG. 2 to the LSTP 30, would get congested depending on the number of voice trunks available.

Now, a description of the operation will be given where the network includes the present invention. With 1% call sampling enabled, the SCP 22, 23 prior to a media event would have received on average of 0.01×200=2 TN messages per second. Using a measurement interval of 30 seconds as an example, there would be 60 TN messages available during a measurement interval. Using the rule that usually 70 percent of calls are answered, one would not have more than a few busy calls to a given number. Therefore, busy counts associated with any number will not be enough to exceed the threshold $O_2$, and ACG will not be invoked. After the media event, SCP will receive 0.01×300 =3 TN messages per second or a total of 90 TN messages during the measurement interval. Statistically, ⅓ of these 90 TN messages, or 30 TN, will belong to the 1-800-555-1111 number. Now if a high percentage, such as 28 out of 30 of these TN messages have a busy status, then one can reasonably conclude that approximately 28 to 30 percent of 100 queries per second are going to be busy. The percent busy for the 1-800-555-1111 will now exceed the threshold of $O_2$=0.95, and ACG will be invoked on that 10-digit number.

It is possible to wait for an average call holding time and then examine the number of TN messages and, depending on the value of busy counts and rate, either use a larger gap or remove the gap (or have it increase or decrease on a percentage basis). Preferably, the step of processing includes a substep of constructing a table at the SCP for each measurement interval. As herein embodied, a table similar to Table 2-1 is preferably created and maintained in the SCP for the number contained in the TN messages for each measurement interval.

TABLE 2-1

| Number | $B_n$ | $A_n$ | $G_n$ | $E_n$ | $f_{Bn}$ | $R_n$ |
|---|---|---|---|---|---|---|
| 1-800-555-1111 | 18 | 2 | 0 | 9 | 0.93 | 290 |
| 1-800-555-2222 | 3 | 1 | 1 | 1 | 0.67 | 60 |
| 1-800-555-3333 | 2 | 3 | 0 | 0 | 0.4 | 50 |
| 1-800-555-4444 | 5 | 19 | 3 | 5 | 0.31 | 320 |

Suppose as an example, there are 4 numbers contained in the samples. The SCP will then compute $f_{Bn}$ and $R_n$ for each number n=1,2,3,4. First a test or calculation 1 is performed with $O_1$=200. The numbers passing test 1 are 1-800-555-1111 and 1-800-555-4444. Next test 2 is performed with $O_2$=0.90. The only number satisfying test 2 is 1-800-555-1111. Thus, a 10-digit ACG can be invoked on 1-800-555-1111. Based on thresholding of this list, a gap can be put on a specific number, and this information can be sent to SSPs to control the rate of calls that can be originated to that number. The control levels can increase or decrease by first choosing a certain gap level, and then monitoring the number of busy calls and the rate received during the next measurement interval. If the count of busy calls received and rate for the number is still high, a larger gap interval can be set and the process can be repeated until the proper gap is found.

The numbers with both $R_n > O_1$ and $f_B > O_2$ are selected for call gapping. At this time, network managers should be notified by proper alarms or displays. Note that this method does not disable or replace the regular ACG procedure that exists in the SCP. If SCP receives a high rate of queries, regardless of which number and call status, ACG procedure is invoked to protect the SCP for overload. After this ACG is invoked on number n abatement threshold $A_1$ for the call attempt rate, is used to remove the ACG. Only if $R_n < A_1$ is ACG removed. One can also place an abatement threshold on percent busy. However, doing that implies that the network will not be able to use operators to their maximum. Having only an abatement threshold for rate means that as long as the volume of the calls are below a certain threshold, the control will be removed regardless of the status of calls. The gap value and duration, and $A_1$ can be set by network manager. A guideline for setting the abatement threshold is to select $A_1$ such that $A_1 << \min(C_{D-quad}, C_{IC})$. $C_D$-quad denotes the capacity of the smallest D-quad connecting and LSTP pair to the regional RSTP. $C_{IC}$ denotes the capacity of the smallest IC quad connecting on LSTP to an ICSTP pair.

It is possible to include the following optional test 0 before test 1 and test 2. Test 0: if $R_n > \min(C_{D-quad}, C_{IC})$ is true, then perform test 1 and test 2. Test 0 is intended to make sure that if the load presented to SCP is less that the minimum of other resources in the network, no control actions are taken. Performing test 0 implies that if the network has capacity to process calls, even if these calls are going to be busy, there will not be any control put on these calls. Controls are invoked only if the volume of calls is greater than the capacity of a network segment. As described previously, this situation will start affecting other calls, un-related to the number.

The concept of percent busy and high call attempt rate estimated and obtained using the methods and algorithms presented herein can also be used as a decision node in the service logic of a customer in the AIN SCP. If the calls to a particular destination are receiving very high busy treatments, alternate locations may be specified in the service logic for routing the calls. Basically, a dynamic call distribution logic can be created where the network routes the calls to multiple locations based on volatility of traffic and availability of operators in different sites. This feature would be useful for customers which have pools of operators at different sites, and the traffic demand may vary quickly based on some advertisement on TV (e.g., Home Shopping network).

In sum, the method of the present invention is advantageous in that it does not require expensive software changes to the SSPs. The SSP is only required to return a TN message with an index called ED that SCP assigns via the response message from SCP to SSP. The SSP then just inserts this index in the TN message and sends it back to SCP with other information relating to the call. This procedure is already part of 800, PVN, and AIN requirements. In this invention, the SCP must assign the called number contained in the Query message in the ED field.

This method requires that call sampling be active at all times. However, the percentage of call sampling can be set to very low values, e.g., 1%. This will only add one message for every 100 query response pair. The advantage of using call sampling is that it is already part of the requirements for 800, PVN, and AIN, and should be already implemented by SSPs. The other advantage is that the information is collected from all SSPs in a very convenient form through the SS7 network as opposed to using an external link monitoring system that must be present on many links. In addition, the percentage of sampling could be easily adjusted by network administrators via Service Management System (SMS).

By sampling the calls, SCP only has to examine a rather small number of TN messages in order to determine that a focused overload condition exists. Thereby, having a smaller impact on processor real-time capacity. The product of $f_s \times T$ determines the number of available samples where T as noted before denotes the length of SCP measurement interval in seconds during which Termination Notification messages are collected and processed. Both $f_s$ and T can be used to adjust the control. For example, by shortening T and increasing $f_s$, one can increase the quickness of the number detection algorithm. And similarly by having a longer T one can improve the reliability of the decision process by collecting more samples over a longer time period.

The method inherently indicates that the local telephone companies do not need to know how many operators or physical lines are behind a given number. Apparently, service providers do not like to always share this information with the local company. The method of the present invention estimates that operators are exhausted based on the count of busy treatment via the TN message.

The procedure attempts to protect the network from overload and not just the SCP or the links. The procedure is fair because it controls the calls that are causing congestion, and more importantly it controls the calls when the majority of them are going to busy. It uses existing SS7 standardized TN format. It re-uses the existing SCP and SSP ACG capability.

While a certain preferred embodiment of the invention has been illustrated and described, it is understood that the invention is not limited to but may be variously embodied and practiced within the scope of the following claims and their equivalents.

What is claimed is:

1. A method of managing focused overloads directed to a single subscriber telephone number in a network including service control points, said method comprising the steps of:

sampling service control point calls for a fraction of all queries during successive management intervals;

processing termination notification messages received during each current measurement interval;

determining an amount of focused overload of said single subscriber telephone number following each measurement interval in accordance with a processed termination notification message; and invoking automatic code gapping on said subscriber telephone number at times when the determined amount of overloading exceeds a predetermined threshold.

2. The method of claim 1 wherein the step of determining the amount of overloading comprises:

determining an estimated rate of call attempts to said single subscriber telephone number made during a predetermined interval.

3. The method of claim 1 wherein the step of determining the amount of overloading comprises:

determining a fraction of calls not completed to said single subscriber number during a preceding management interval.

4. A method of managing focused overload events directed to a single telephone number in a network including service control points, said method comprising the steps of:

sampling service control point calls for a fraction of all queries during measurement intervals;

processing termination notification messages received during each current measurement interval;

determining, at the end of each measurement interval, a fraction of calls not completed and an estimated rate of call attempts to said single telephone number during a preceding measurement interval in accordance with the content of the processed notification termination messages;

comparing the determined call attempt rate with a selected threshold rate;

comparing the determined fraction of incomplete calls with a selected threshold at times when the call attempt rate exceeds the selected threshold rate; and invoking automatic code gapping on said single telephone number at times when the fraction of incomplete calls exceeds the selected threshold.

5. The method of claim 2 wherein the step of determining the rate of attempted calls to said single subscriber telephone number comprises the steps of:

dividing the sum of busy calls, answered calls, no-answer calls, and erroneous calls occurring during the preceding measurement interval by the length of the measurement intervals; and multiplying the result by the fraction of all transactions to the service control point services that are requested to send a termination notification message.

6. The method of claim 4 wherein the step of determining the rate of attempted calls to said single telephone number comprises:

dividing the sum of busy calls, answered calls, no-answer calls, and erroneous calls occurring during the preceding measurement interval by the length of the measurement interval; and multiplying the result by the fraction of all transactions to the service control point services that are requested to send a termination notification message.

7. The method of claim 3 wherein the step of determining the fraction of incomplete calls comprises:

determining the number of busy calls and erroneous calls to said single subscriber telephone number.

8. The method of claim 3 wherein the step of determining the portion of incomplete calls comprises:

dividing the sum of the busy calls and erroneous calls by the sum of the busy calls, answered calls, no-answer calls, and erroneous calls.

9. The method of claim 4 wherein the step of determining the fraction of incomplete calls comprises:

determining the number of busy calls and erroneous calls to said single telephone number.

10. The method of claim 4 wherein the step of determining the portion of incomplete calls comprises the step of:

dividing the sum of the busy calls and erroneous calls by the sum of the busy calls, answered calls, no-answer calls, and erroneous calls.

* * * * *